United States Patent
McCaw

[15] 3,703,108
[45] Nov. 21, 1972

[54] DIFFERENTIAL

[72] Inventor: Thomas M. McCaw, 2113 South 7th Street, Lafayette, Ind.

[22] Filed: April 12, 1971

[21] Appl. No.: 133,195

Related U.S. Application Data

[63] Continuation-in-part of Ser. No. 59,904, July 31, 1970, abandoned, which is a continuation-in-part of Ser. No. 816,741, April 16, 1969, abandoned.

[52] U.S. Cl.................................74/713, 74/459.5
[51] Int. Cl.......................F16h 1/40, F16h 55/04
[58] Field of Search....................74/710–711, 713, 74/459.5

[56] References Cited

UNITED STATES PATENTS

| | | | |
|---|---|---|---|
| 253,863 | 2/1882 | Haskin | 74/459.5 |
| 2,510,996 | 6/1950 | Morgan | 74/713 |
| 2,924,125 | 2/1960 | Brandon | 74/713 |
| 3,057,226 | 10/1962 | Blomberg | 74/713 |
| 3,213,700 | 10/1965 | Brownyer | 74/459.5 X |
| 3,335,623 | 8/1967 | Roach | 74/713 X |
| 3,344,688 | 10/1967 | Frost | 74/711 |
| 3,362,258 | 1/1968 | Thornton | 74/711 |
| 3,435,697 | 4/1969 | Haville | 74/459.5 |

Primary Examiner—A. T. McKeon
Attorney—Woodling, Krost, Granger & Rust

[57] ABSTRACT

A torque proportioning differential is disclosed for use in a vehicle which enables distribution of torque to each drive wheel to match traction conditions at each wheel so that maximum available tractive effort to drive the vehicle is obtained. This is accomplished by the use of bevel gears for the pinions and side gears of either the straight, Zerol (Registered Trademark) or spiral type. These gears are formed so that the face cone apex does not coincide with the generated pitch cone apex. This construction produces a tooth contact between the pinions and side gears which travels from one end of the teeth to the other through each tooth mesh cycle. This contact condition accomplishes the torque proportioning. Also shown is modification of the face angles of the pinions and side gears to increase capacity of the device and to strengthen the ends of the teeth of the gears. This modification produces compound face structures a portion of which is defined by a cone having an apex which coincides with the generated pitch cone apex and another portion which is defined by a cone having an apex which does not coincide with the generated pitch cone apex. The disclosure also relates to the construction of the bevel gears.

35 Claims, 12 Drawing Figures

PATENTED NOV 21 1972 3,703,108

INVENTOR.
THOMAS M. MCCAW
BY
Woodling, Krost, Granger & Rust
Attys

INVENTOR.
THOMAS M. MCCAW

INVENTOR.
THOMAS M. MCCAW

DIFFERENTIAL

This application is a continuation-in-part of U.S. Pat. application Ser. No. 59,904, now abandoned filed July 31, 1970 entitled DIFFERENTIAL which in turn was a continuation-in-part of U.S. Pat. application Ser. No. 816,741 filed Apr. 16, 1969 entitled DIFFERENTIAL, now abandoned.

The present invention relates broadly to the variable leverage type of differentials. The bevel gears used in the variable leverage (Timken Detroit Axle shown in U.S. Pat. No. 2,009,915 and Wildhabr shown in U. S. Pat. No. 2,308,558) and special spiral bevel (shown in U. S. Pat. No. 1,248,687) torque proportioning types as well as bevel gears used in conventional differentials, all use bevel gear geometry with the pitch, face and root cone apexes of both the pinion and side gears coinciding approximately at the center of the differential. When the pitch, face and root cone apexes approximately coincide, theoretical contact lines full length of the teeth are obtained. Also, the clutch type locking differential (Roach U. S. Pat. No. 3,335,623) with extended focal point of the teeth of the pinion has theoretical contact lines full length of the teeth. This is also true in other structures as in U. S. Pat. No. 2,918,831 issued Dec. 29, 1959 in the name of E. Wildhaber.

The teeth in the side gears and pinions described in Wildhaber U.S. Pat. No. 2,918,831 are produced so that the generated pitch cone apex coincides approximately with the face and root cone apexes, all of which are separated from the intersection of the gear and pinion axes. The pinion teeth have a uniform inclination of profile along their length but the gear teeth show an increasing inclination at increase in distance from the cone apexes. The improvement in the present invention over Wildhaber U. S. Pat. No. 2,918,831 and Roach U. S. Pat. No. 3,335,623 results from the fact that the teeth are generated as conventional bevel gears are generated with the theoretical pitch cone apex and the generated pitch cone apex coinciding generally at the intersection of the gear and pinion axes. This produces teeth profiles which are inclined uniformly throughout the length of the teeth.

The tooth contact pattern of the gears in the present invention has a "bias" condition; ie. the contact travels from the top of the teeth at one end of the teeth to the bottom of the teeth at the other end — a condition which is normally avoided in all bevel gear design and practice throughout the gear manufacturing industry.

Another improvement in the present invention over Wildhaber and Roach results from the production of the teeth with the generated pitch cone apex and the apex of one of the compound face cones of both gear and pinion approximately coinciding with the intersection of gear and pinion axes, and the apex of the other section of the compound face cones intersecting the axes of the gear and pinion at points removed from the generated pitch cone apexes.

In the preferred form of this invention, the addendum structure of the pinions from the end of the teeth nearer to the face cone apex to about mid-point of the face and the addendum structure of the side gears from about mid-point of the face to the end away from the face cone apex have proportions similar to standard bevel pinions and gears; and, from the aforementioned points at about mid face of the pinions and side gears to the end of the teeth opposite the face cone apex for the pinions and to the end of the teeth nearer to the face cone apex for the gears, the addendum structure tapers decreasingly relative to standard bevel gears and pinions.

DEFINITION OF TERMS

1. Theoretical pitch cone—The theoretical pitch cones of the pinion and gear are generated by rotating about the respective axis a line between the intersection of the axes and the common point on the pitch circles.

2. Generated pitch cone—The generated pitch cones of the pinion and gear are generated by rotating about the respective pinion and gear axis the line which intersects the respective axis and coincides with a line on the teeth profiles of constant profile inclination.

3. Face cone—The face cones of the pinion and gear are generated by rotating about the respective pinion and gear axis the line which intersects the respective axis and is a part of the line which defines the tops of the teeth.

5. Addendum—The addendum is the difference in radial distance of a point on the face cone and a point on the pitch cone on the same radial line.

6. Root Cone—The root cone of the pinion and gear are generated by rotating about the respective pinion and gear axis the line which intersects the respective axis and is a part of the line which defines the bottoms or roots of the teeth.

7. Dedendum—The dedendum is the difference in radial distance of a point on the root cone and a point on the pitch cone on the same radial line.

Other objects and a fuller understanding of this invention may be had by referring to the following description and claims taken in conjunction with the accompanying drawings, in which:

Figure 1:
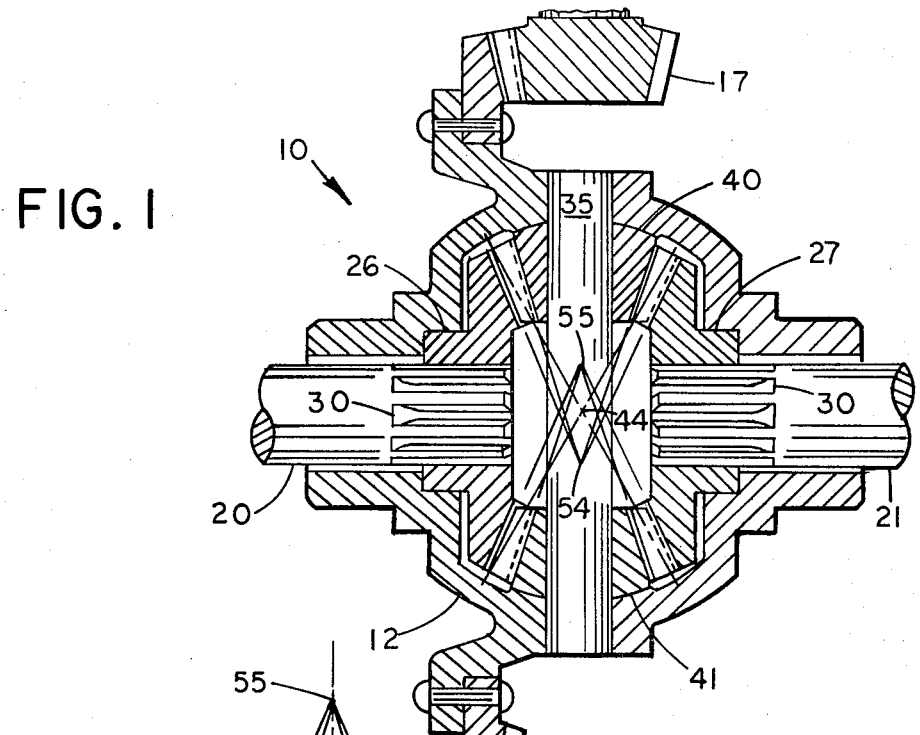
FIG. 1 is a sectional view of a torque proportioning differential constructed in accordance with the teachings of the present invention.
Figure 2:
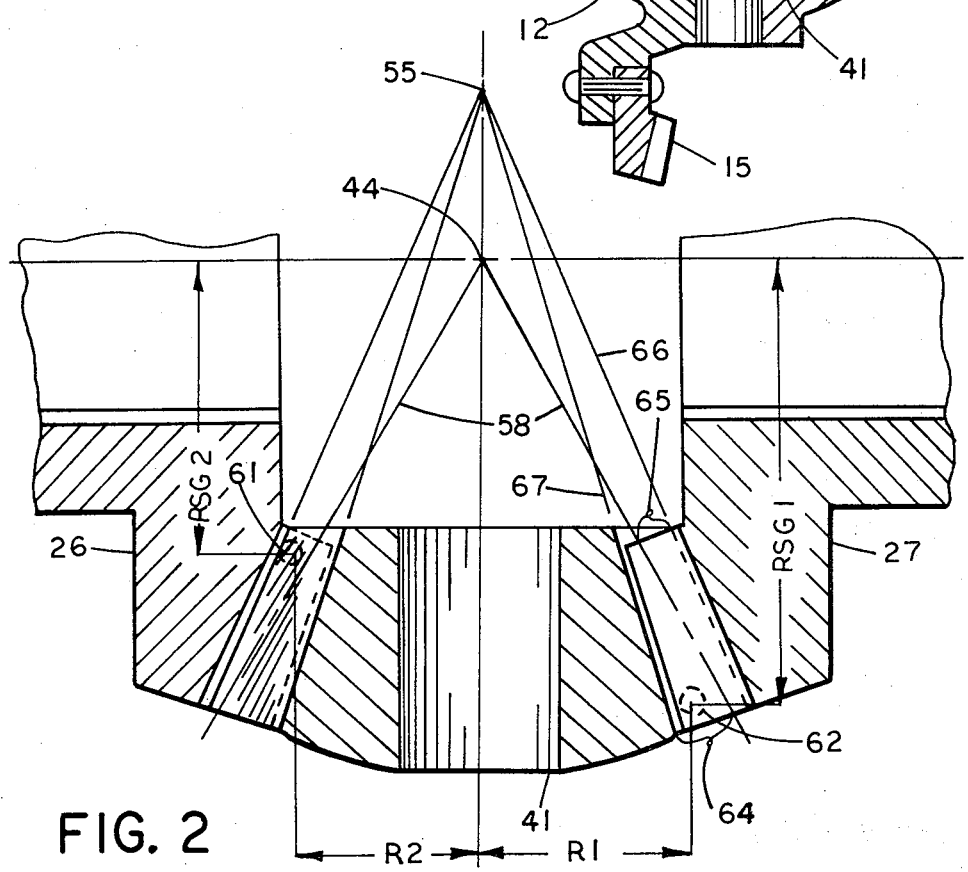
FIG. 2 is a fragmentary view showing a portion of the device shown in FIG. 1 which assists in demonstrating the operation and advantage of the present invention.
Figure 3:
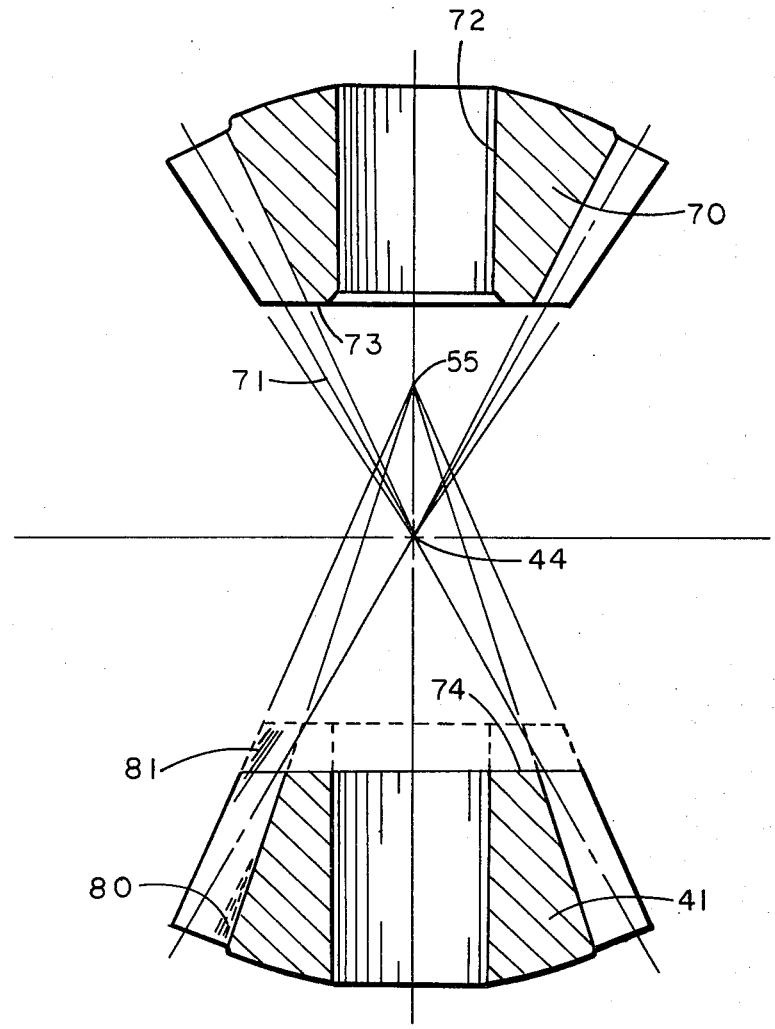
Figure 4:
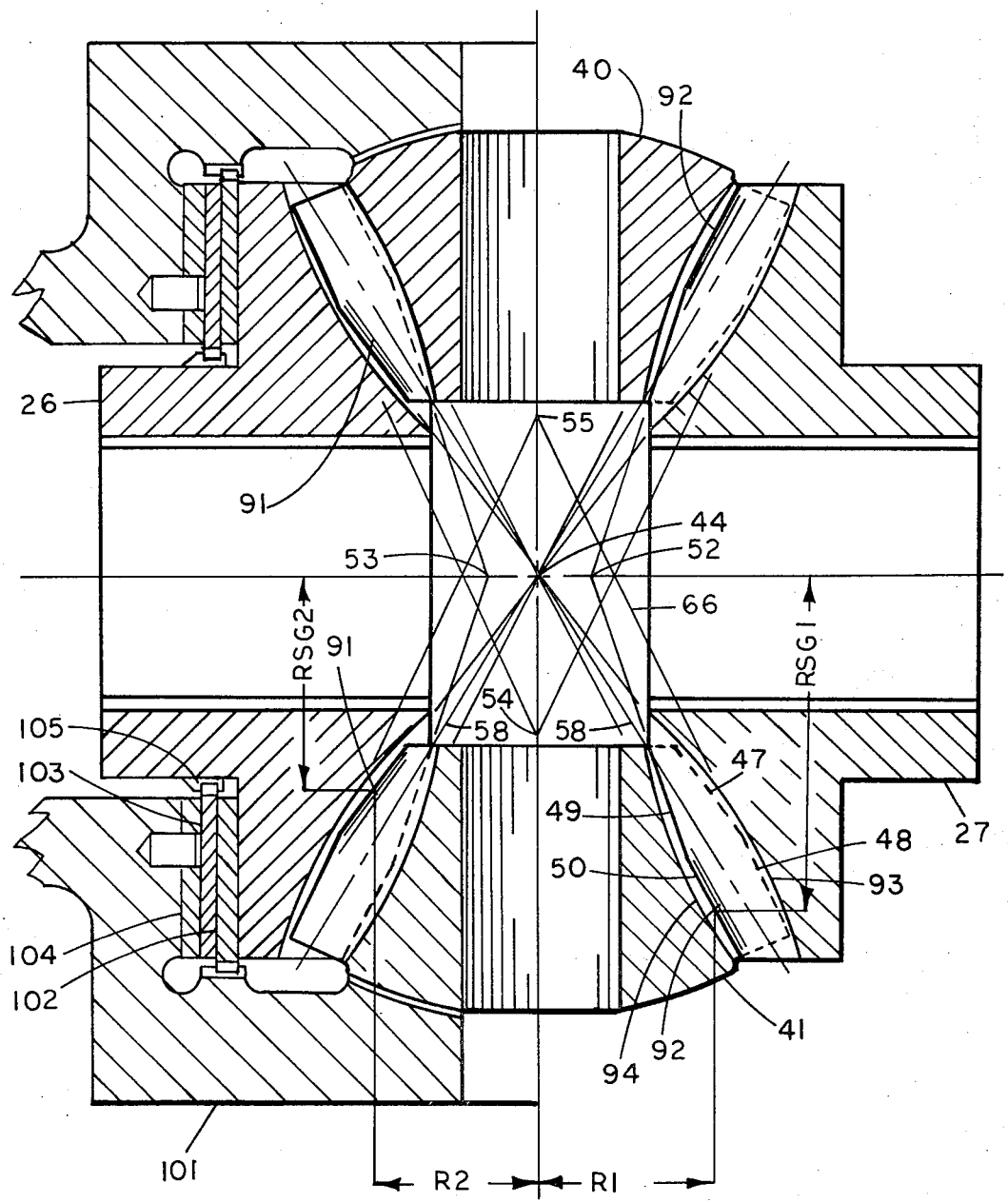
Figure 5:
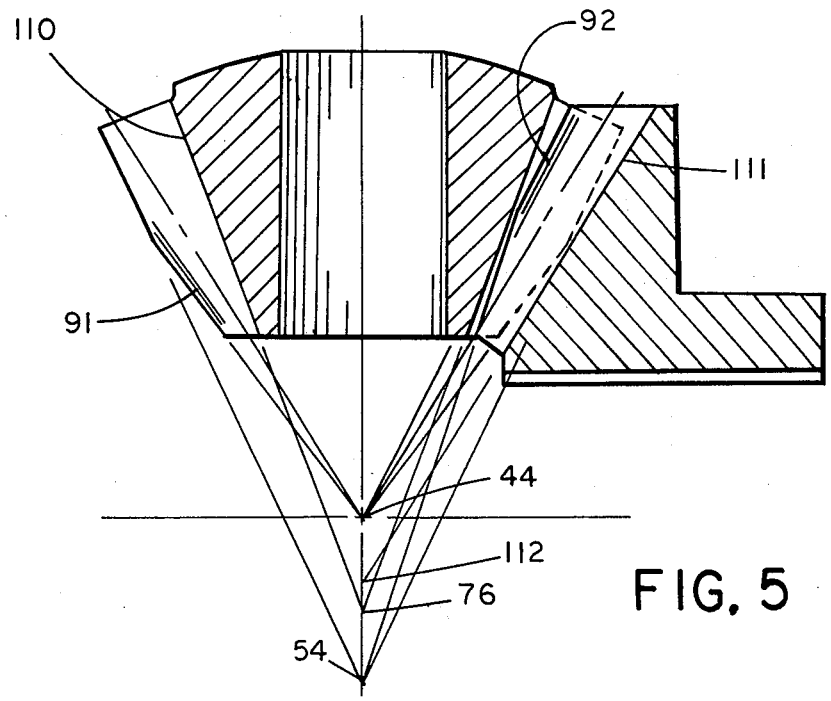
Figure 6:
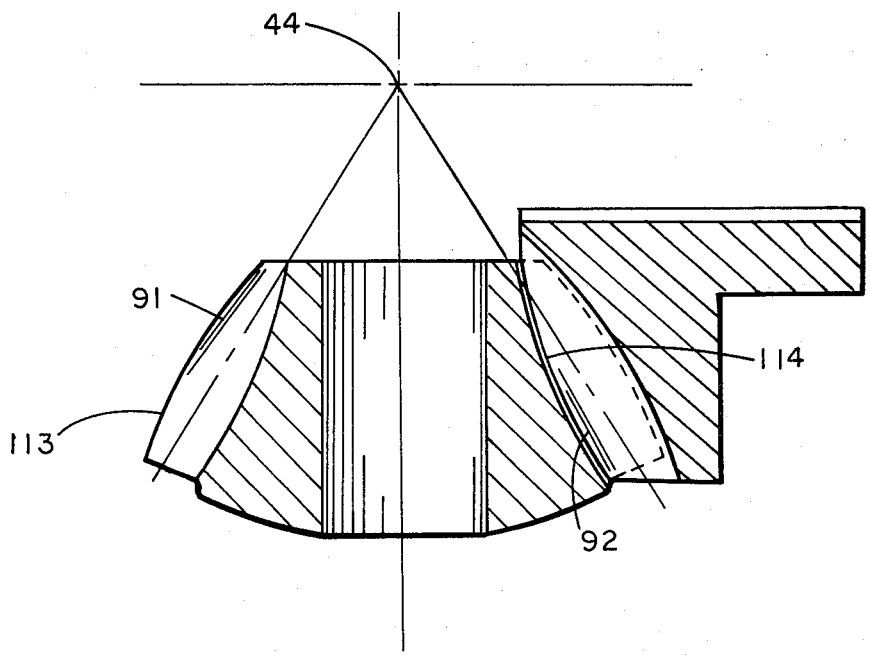
Figure 7:
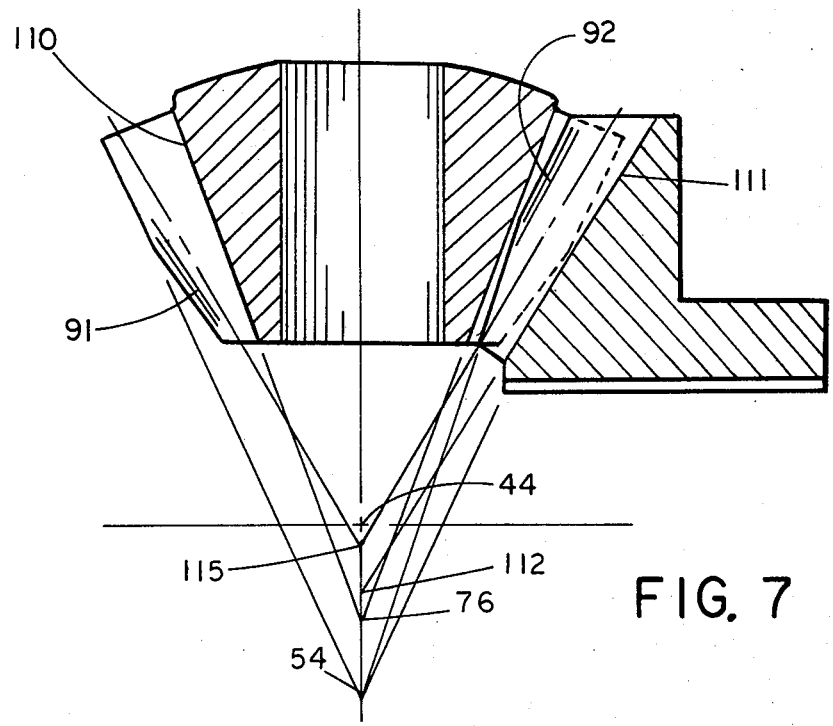
Figure 8:
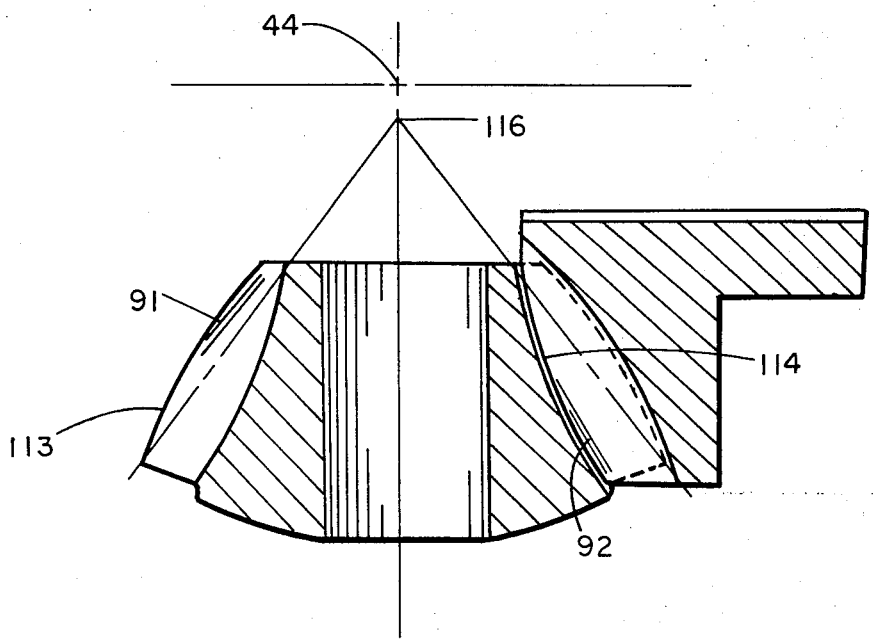
Figure 9:
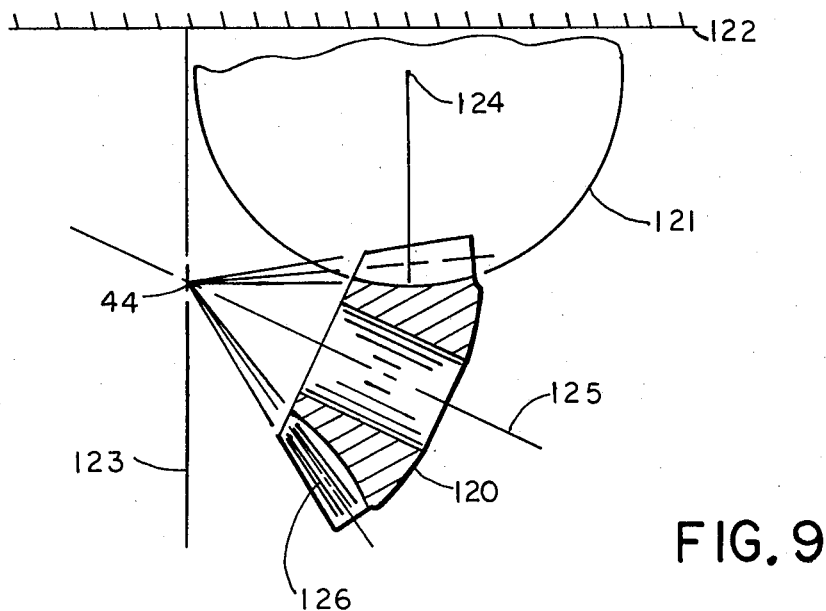
Figure 10:
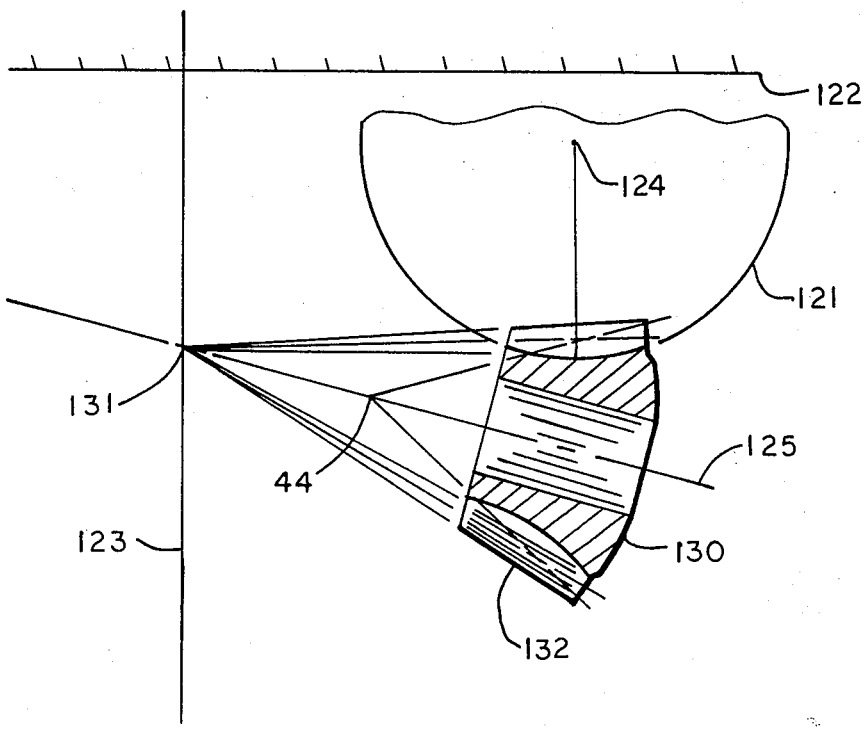
Figure 11:
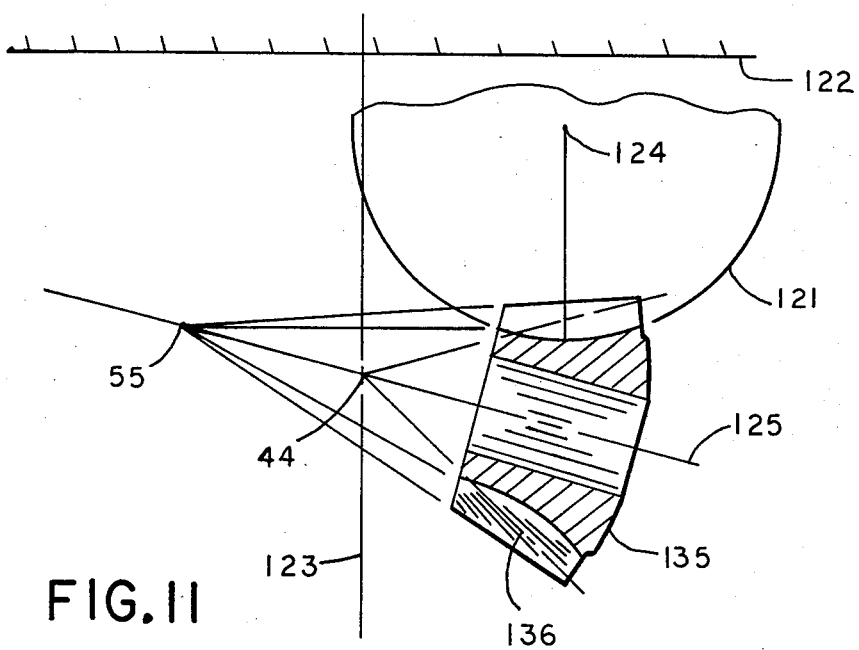
Figure 12:
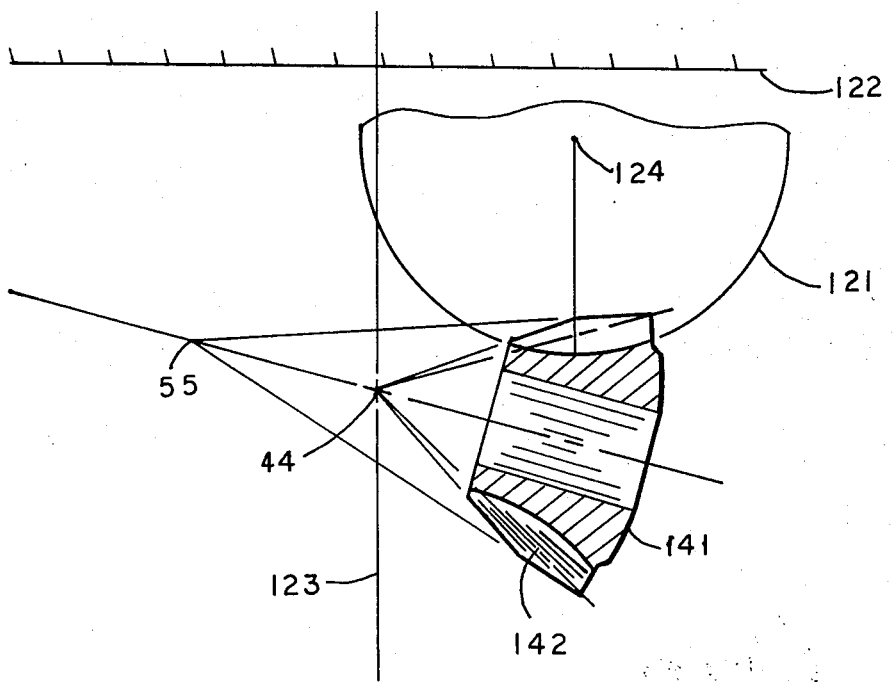

FIG. 3 is a view which illustrates the strength advantages of a bevel tooth pinion whose face and root cone apexes do not intersect its axis at the center of the differential as compared to a bevel tooth pinion whose pitch, face and root cone apexes do intersect its axis approximately at the center of the differential; and FIG. 4 is a view similar to FIGS. 1 and 2 showing a modification of the differential wherein the face cones of the gears are modified;

FIGS. 5 and 6 are views showing additional modifications of the face and root geometry;

FIGS. 7 and 8 show variations in the generated pitch cone apex; and,

FIGS. 9, 10, 11 and 12 are views showing methods of generating the teeth in conventional pinions (FIG. 9), Wildhaber (U.S. Pat. No. 2,918,831) and Roach (U.S. Pat. No. 3,335,623) FIG. 10 and the present invention (FIGS. 11 and 12).

The differential of the present invention is seen in FIG. 1 of the drawings and is indicated generally by the reference numeral 10. The differential includes a housing or case 12, which has a conventional ring gear 15 attached to the exterior thereof which is adapted to be driven by a drive pinion 17 from a motive power source, not shown. First and second axles 20 and 21 extend into opposite ends of the housing 12 as shown and are rotatively attached to first and second bevel side gears 26 and 27, respectively, by means of splined connections 30. The side gears 26 and 27 are coaxial with each other and with the respective axles to which they are attached.

A pinion shaft 35 is fixedly mounted in the housing 12 as shown and serves to rotatively support first and second bevel pinion gears 40 and 41 in opposite sides of the casing from each other and each of the pinion gears has its teeth in meshing engagement with each of the side gears 26 and 27.

The side gears shown are straight bevel gears, however, they may be replaced by Zerol, (Registered trademark) or spiral bevel gears under the teachings of the present invention without departing therefrom.

All bevel gears have what is known in the art as a theoretical pitch cone and in conventional differentials as well as the illustrated form of this differential the theoretical pitch cone apex intersects the axis of the respective gear approximately at the center of the differential. The center of the differential in FIG. 1 has been indicated by the reference numeral 44 and is the intersection of the axes of the side gears with the axes of the pinion gears. Face and root cone apexes are indicated at 54 and 55 for pinion gears 40 and 41, respectively.

FIG. 2 is a view which assists in demonstrating the operation of the present torque proportioning differential and in this view only pinion gear 41 has been shown along with portions of side gears 26 and 27. In this view, theoretical pitch cone lines 58 have been drawn and it will be seen that the theoretical pitch cone apex coincides with the axes intersection at 44. In this embodiment the generated pitch cone apex coincides with the theoretical pitch cone apex and is also indicated by the lines 58. The pinion face cone lines are indicated by numeral 66 and the pinion root cone lines are indicated by numeral 67. In the particular construction shown in FIG. 2, the engagement at a particular point in the rotative cycle of the gears is indicated by the dotted areas 61 and 62. R1 and R2 are the respective distances these areas of contact are from the axis of the pinion and RSG1 and RSG2 are the respective distances these areas of contact are from the axis of the side gears.

The contact pattern of the construction shown will vary from one end of the teeth to the other end as the teeth go through a mesh cycle. With an odd number of teeth in the pinions (which is the construction shown) or with the proper combination of the number of teeth and spiral angle (for example when a spiral bevel gear is used), the torque transmitted to the axles 20 and 21 will be proportional to RSG1 × R1 and RSG2 × R2, respectively, and the ratio of axle torques will be:

$$RSG1 \times R1/RSG2 \times R2$$

In one portion of the teeth mesh cycle, RSG1 and R1 will be larger than RSG2 and R2 as with a pinion tooth meshing with a space in side gear 27 and a pinion space meshing with a tooth in side gear 26. In the other portion of the teeth-mesh cycle, RSG2 and R2 will be larger than RSG1 and R1 as is the situation with a pinion space meshing with a tooth in side gear 27 and a pinion tooth meshing with a space in side gear 26. These tooth mesh conditions give a much larger variable leverage effect than can be obtained in devices of the prior art.

It is preferred to have an odd number of teeth in the pinions and with the number of teeth in the side gears divisible by 4 when four pinions are used, or by 2 or 4 when two pinions are used as shown in FIG. 1. It will be appreciated by those skilled in the art that when four pinions are used instead of two as shown in FIG. 1, that one of the additional pinions occupies a position on the other side of the center 44 of the differential and the other additional pinion occupies a position on the viewer's side of the center 44 of the differential. In FIG. 2 the pinion dedendum is indicated by the bracket 64 and the pinion addendum is indicated by the bracket 65.

FIG. 3 illustrates somewhat schematically the pinion 41 shown in the differential of FIG. 1 in relation to the center 44 of the differential. Shown in the top part of the view is a straight bevel pinion gear 70 of conventional construction whose construction is such that both its theoretical and generated pitch cones 71 intersect its axis at the center 44 of the differential. The conventional construction limits the length through the bore 72 and the section 73 between the teeth and the bore 72 at the inner or small end produces a weak area. This produces high pressure and rapid wear of the pinion at this point and this weak section is one of the common points of failure of pinion gears in differentials. The construction as presently disclosed with practically all addendum teeth at the small end of the pinion makes possible greater length through the bore of pinion 41 resulting in a correspondingly stronger section 74 at the same position. This reduces pressure and wear on the bore in the construction of the present invention.

The device of FIGS. 1, 2 and 3 has shown some limitations in capacity because of surface spalling at points 80 FIG. 3 on the side gear teeth and 81 FIG. 3 on the pinion teeth. Also, some breakage of the teeth at the ends has occurred because of the high bending stresses at the ends of the teeth when contact occurs at points 80 and 81.

The limitation in capacity led to modification of the face angles of the pinions and side gears as shown in FIG. 4, to give sufficient length of contact to eliminate the surface distress. In FIG. 4 where the structure is the same as in the device of FIGS. 1, 2 and 3, the same reference numerals have been used and where new structure results, new reference numerals have been utilized. Each of the pinions 40 and 41 have teeth which are comprised of first and second portions identified by numerals 47 and 48. Portion 47 extends from approximately mid face to the inside or toe of the pinion and portion 48 extends from approximately mid face to the outside or heel of the pinion. The face cone apex of portion 47 of pinions 40 and 41 coincide with the theoretical and generated cone apexes at 44. The face cone apex of portion 48 of pinion 40 and 41 coincide with the axis of the pinions at points 54 and 55, respectively.

Each of the side gears 26 and 27 have teeth which are comprised of first and second portions identified by numerals 49 and 50. Portion 49 extends from approximately mid face to the inside or toe of the gear teeth and portion 50 extends from approximately mid face to the outside or heel of the gear. The face cone apex of portion 50 coincides with the theoretical and generated cone apexes at 44. The face cone apexes of portions 49 of side gears 26 and 27 coincide with the axis of the gears at points 53 and 52, respectively. The resulting lines of contact 91 for the pinions, and 92 for the side gears are approximately one-half the length of the teeth. Using circular milling type gear cutting machines to cut the teeth, the root lines 93 and 94 are curved to envelope the faces of the respective mating parts. This gives "stubbed" teeth at both ends of the teeth which reduces the bending stresses. Also, the length of the pinions can be further increased. The face cone apex of the modified portion of both the pinion and side gear will most always approximately coincide with the generated and theoretical pitch cone apexes 44. The modified faces of the pinion and side gears will coincide with the lines of contact of the teeth. The teeth may be generated so that the generated pitch cone apex may be on either side of the center of the differential away from or toward each pinion respectively, but usually between the front faces of the pinions and side gears.

The structure results in pinions with an addendum taper which increases with increases in distance from the pitch cone apex to approximately mid face and which decreases with increase in distance from approximately mid face to the end of the teeth away from the pitch cone apex. This addendum, however, from approximately mid face to the end of the teeth away from the pitch cone apex may only change in that it may not necessarily decrease but may increase at a lesser rate or may remain constant. The side gears which result have an addendum taper which increases with an increase in distance from the pitch cone apex to approximately mid face and which increases at a lesser rate with an increase in distance from approximately mid face to the end of the teeth away from the pitch cone apex. With respect to the side gears, the addendum from approximately mid face to the end of the teeth away from the pitch cone apex is only required to change and need not necessarily increase at a lesser rate but may actually remain constant or even decrease. Stated another way, the side gears and pinions have teeth which increase in depth with increase in distance from both ends of the teeth to approximately the mid point of the teeth. Mid point or mid face from a normal commercial standpoint should be anywhere within the middle one half of the length of a gear tooth or in other words anywhere within 25 to 75 percent of the length of a gear tooth.

The chordal thickness of the teeth decreases from the end of the teeth away from the cone apexes to the end closest to the apexes. This taper in tooth thickness of both pinion and gear does not affect the variable leverage function but does affect the durability of the gears. The teeth of both pinion and gear may have the same taper as conventional bevel gears. In the preferred form the pinion teeth have less taper and the gear teeth more taper in thickness than conventional bevel gears to give maximum strength and durability.

The modifications shown in FIGS. 4, 5, 6, 7 and 8 produce strength and durability greater than conventional gears in a differential with or without a torque proportioning characteristic.

FIGS. 4, 5, 6, 7 and 8 represent possible modifications of standard bevel gears as well as the bevel gears shown in FIG. 2 so as to produce the advantages of the present invention. By standard bevel gear is meant a gear which in its unmodified condition has its theoretical, generated, face and root cone apexes all intersecting approximately at the center of the differential. It will be appreciated from the above that the structure of FIG. 2 performs a torque proportioning effect without the necessity of the modifications shown in FIGS. 4 through 8.

The improvements from the modification of the face angles and the enveloping root lines are as follows:
1. Lower surface stress.
2. Lower bending stresses at ends of the teeth.
3. Greater length for pinions.
4. Greater durability of torque proportioning effect.

The torque proportioning effect from the variable leverage construction varies from approximately 1.1 to 1.75 through each tooth mesh cycle. Some applications can benefit from a torque proportioning effect such as produced with clutch plates. By combining the friction characteristics of clutch plates and the variable leverage characteristics of the modified gears and pinions, a larger torque proportioning effect is produced with less cost. For example, one set of clutch plates as shown in FIG. 4, will produce a torque proportioning effect which varies from 1.65 to 2.63 through each tooth mesh cycle. Operation is as follows:

In FIG. 4, clutch plates 102 and 104 are fixedly mounted to differential case 101. Clutch plate 103 is rotatively connected to side gear hub 105. The separating force from the bevel gear teeth compress the clutch plates producing a friction torque which restrains differential action. Spring means separate the plates when the compression force is released. Preferably, the clutch plates will be mounted on both side gears. Expressed mathematically, the benefit from the variable leverage effect is as follows:

$$T_1 = T_f(1 + V_L) + V_L T_2$$

Where:
 $T_1$ is torque in one axle shaft.
 $T_2$ is torque in other axle shaft.
 $T_f$ is friction torque in each clutch plate section.
 $V_L$ is gear variable leverage effect.

The clutch plates can be loaded with springs to produce an in built torque $T_f(1 + V_L)$ when torque in slipping wheel shaft $T_2$ is zero.

In FIG. 5, the theoretical pitch cone apex 44 is at approximately the center of the differential. When the teeth are cut with straight root lines and with equalized clearance at each end of the teeth, the pinion root cone 110 will intersect the pinion axis at apex 76 and the gear root cone 111 will intersect the pinion axis at apex 112. This modification is essentially a combination of FIGS. 2 and 4 in that the root cones of FIG. 2 are combined with the face cones of FIG. 4.

In FIG. 6, the faces 113 and 114 of both the pinion and side gears respectively are fitted to the curved root lines of the mating parts. The curved face line 113 of the pinion and the curved face line 114 of the side gear are equivalent to the compound face lines of FIG. 4 and identified in FIG. 4 by reference numerals 47, 48, 49 and 50.

FIGS. 7 and 8 show generated pitch cone apexes 115 and 116 removed from the center 44 of the differential. These figures demonstrate that the generated pitch cone apex may be positioned other than at the theoretical pitch cone apex 44. Apex 115 demonstrates that the generated pitch cone apex may be on the opposite side of center 44 from its pinion and apex 116 demonstrates it may be on the same side.

FIGS. 9, 10, 11 and 12 illustrate in a somewhat schematic manner the method of constructing the prior art gears referred to hereinabove as well as the method of constructing the gears used in the present invention and serve to point out the differences.

FIG. 9 shows the production of a conventional bevel gear 120 mounted in a gear cutting machine which has a cutter 121 operating on a cradle 122 and positioned so that the teeth are cut as shown when the cradle rotates about its axis 123. The axis of rotation of the cutter is indicated at 124. As the cradle rotates about its axis, bevel gear 120 rotates about its axis 125 with a ratio determined by the angle of the cutter and the pressure angle required on the gear teeth. In the production of conventional bevel gears on the machine illustrated in FIG. 9, great care is exercised to assure coincidence of the cradle (generating) axis 123 and the theoretical, face and root cone apexes 44, to give contact lines 126 the full length of the teeth. This method of cutting will produce the pinion shown in the top half of FIG. 3 with the exception of the curved root line. The two are interchangeable.

FIG. 10 shows the production of a pinion gear 130 of the type referred to hereinabove in Roach U.S. Pat. No. 3,335,623 and Wildhaber U.S. Pat. No. 2,918,831. The gear 130 is positioned relative to the cradle axis 123 so that the face and root cone apexes 131 intersect on the axis 123. A different ratio between the cradle rotation about its axis 123 and the gear rotation about its axis 125 is required, relative to the gear shown in FIG. 9. Also cutter 121 is positioned further away from the cradle axis 123 in order to cut the teeth in the pinion as shown. Lines of contact 132 are produced which are full length of the face. Note that the theoretical pitch cone apex 44 is separated from the face and root cone apexes 131.

In FIG. 11 the cutting of the pinion 41 of FIG. 2 is illustrated except that the root lines are curved rather than straight as shown in FIG. 2. The axis of generation 123 coincides with the theoretical pitch cone apex 44. The ratio between the cradle rotation and the gear rotation is the same as for FIG. 9. The teeth are therefore generated to produce lines of contact 136. Note that the generated pitch cone apex coincides with the theoretical pitch cone apex at 44 and that the face and root cone apexes 55 are spaced apart from 44. The pinion shown in FIG. 2 and the pinion 135 produced in FIG. 11 are completely interchangeable.

FIG. 12 illustrates the same gear cutting machine shown in FIGS. 9, 10 and 11 and illustrates the manufacture of the pinion 41 shown in FIG. 4, however, in this figure the pinion gear has been identified by the numeral 141. This Figure shows the gear blank positioned in the same position in the gear cutting machine as the blank 135 shown in FIG. 11. Tooth contact lines 142 will be obtained. The modification of the face structure on gear 141 is not accomplished in this machine but rather in the production of the blank itself. It will be noted in this figure that the face cone of the unmodified portion of the teeth has an apex 55 and the face cone of the modified portion near the toe of the gear has a face cone apex which intersects at 44. The gears shown in FIGS. 11 and 12 are therefore essentially the same with the exception of the modification of the face structure of the gear teeth.

As discussed hereinabove, the face cone structure of a conventional bevel gear such as that shown in FIG. 9 can be modified in a manner analogous to the structure shown in FIG. 12 to accomplish the teachings of the present invention. To accomplish this the gear blank shown in FIG. 9 is modified in the area of the face structure to the appearance shown in FIG. 12 and then is positioned in the gear cutting machine as shown in FIG. 9. The cutter axis, the gear blank and the cradle axis are all as indicated in FIG. 9. It will be apparent to those skilled in the art that with the face structure modified in FIG. 9, as shown in FIG. 12, there will be a face cone for the modified portion which will have an apex which will intersect the axis 125 at a point beyond point 44. The ratio of rotation of the cradle about its axis 123 and the rotation of gear 120 about its axis 125 is the same in FIG. 9 as in FIG. 12. The gear thus produced will have a variable leverage characteristic however it will not have the strength and durability of the preferred form of the construction shown in FIG. 12. It will be noted in such a construction that the root cone apex intersects the theoretical pitch cone apex.

When the teeth of the pinions and side gears are produced with involute forms using rack type cutters, the gears will operate with a constant velocity characteristic.

The pinions and side gears may be produced to any form other than involute and still perform with a torque proportioning effect, and, depending upon the tooth form used, a constant velocity characteristic or a variable velocity characteristic.

The teeth in the pinions and side gears may be produced by any known method of manufacturing gears including forging, casting and molding.

It will be apparent therefore from the above teachings that the torque proportioning effects of the present invention are derived from the new and novel face structure. The effect can be modified (increased or decreased) by choice of tooth combinations as aforementioned, by working depth of the teeth and by the use of clutch plates aforementioned and equivalent means. The other structural variations shown such as in the root configuration do not affect the torque proportioning characteristics but do add to the durability or capacity of the device.

The hereinabove disclosure will therefore make it clear to those skilled in the art that the present construction has the advantage of interchangeability of the present gears with any standard bevel gear differential and it will also be clear that the device has a greater torque proportioning effect than modified tooth types. The gears of the present differential may be produced on standard gear cutting machines and the pinion gears are much stronger and resist wear, particularly at the small end of the teeth as a result of this construction.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A differential including in combination a housing, first and second side gears having bevel teeth and being rotatively mounted in said housing, a pinion gear having bevel teeth and being rotatively mounted in said housing and having said bevel teeth thereof in meshing engagement with said bevel teeth of said first and second side gears, the center of the differential being the intersection of the axes of said side and pinion gears, each of said side and pinion gears having a face cone and a generated pitch cone, the face cone of at least one of said side and pinion gears intersecting its respective axis at a face cone apex, the generated pitch cone of said at least one of said side and pinion gears intersecting its respective axis at a generated pitch cone apex, said face cone apex and said generated pitch cone apex being spaced from each other.

2. A differential as claimed in claim 1, wherein said at least one of said side and pinion gears having a theoretical pitch cone which has an apex which intersects said center of the differential, said generated pitch cone apex of said at least one of said side and pinion gears also intersecting said center of the differential.

3. A differential as claimed in claim 2, wherein said generated pitch cone apex intersects said axis at a position on the other side of said center of the differential from said at least one of said side and pinion gears.

4. A differential as claimed in claim 2, wherein said generated pitch cone apex intersects said axis at a position on the same side of said center of the differential as said at least one of said side and pinion gears.

5. A differential as claimed in claim 1, wherein all said teeth are straight bevel teeth.

6. A differential as claimed in claim 1, wherein all said teeth are spiral bevel teeth.

7. A differential as claimed in claim 1, wherein there are two pinions each with an odd number of teeth and an even number of teeth in each side gear divisible by 2 or 4.

8. A differential as claimed in claim 1, wherein there are four pinions each with an odd number of teeth and an even number of teeth in each said side gear divisible by 4.

9. A differential as claimed in claim 1, wherein clutch plate means act between said housing and one of said side and pinion gears to restrain differential action.

10. A differential including in combination a housing, first and second side gears having bevel teeth and being rotatively mounted in said housing, a pinion gear having bevel teeth and being rotatively mounted in said housing and having said bevel teeth thereof in meshing engagement with said bevel teeth of said first and second side gears, the center of the differential being the intersection of the axes of said side and pinion gears, each of said side and pinion gears having a face cone and a generated pitch cone, the face cone of said side and pinion gears intersecting its respective axis at a face cone apex, the generated pitch cone of said side and pinion gears intersecting its respective axis at a generated pitch cone apex, said face cone apex and said generated pitch cone apex of said pinion gear being spaced from each other, said face cone apex and said generated pitch cone apex of each respective side gear being spaced from each other.

11. A differential as claimed in claim 10, wherein said side and pinion gears each have a theoretical pitch cone which has an apex which intersects said center of the differential, said generated pitch cone apex of said side and pinion gears also intersecting said center of the differential.

12. A differential including in combination a housing, first and second side gears having bevel teeth and being rotatively mounted in said housing, a pinion gear having bevel teeth and being rotatively mounted in said housing and having said bevel teeth thereof in meshing engagement with said bevel teeth of said first and second side gears, the center of the differential being the intersection of the axes of said side and pinion gears, at least one of said side and pinion gears having its face structure modified into first and second portions, each of said first and second portions having a face cone and a generated pitch cone, the face cones of said first and second portions of said one of said side and pinion gears intersecting its axis at first and second face cone apexes, the generated pitch cones of said first and second portions of said one of said side and pinion gears intersecting its axis at first and second generated pitch cone apexes, said first and second generated pitch cone apexes and said first face cone apex being spaced from said second face cone apex.

13. A differential as claimed in claim 12, wherein said at least one of said side and pinion gears has a theoretical pitch cone which has an apex which intersects said center of the differential, said first and second generated pitch cone apexes and said first face cone apex also intersecting said center of the differential.

14. A differential as claimed in claim 13, wherein said generated pitch cone apexes intersect said axis at a position on the other side of said differential from said at least one of said side and pinion gears.

15. A differential as claimed in claim 13, wherein said generated pitch cone apexes intersect said axis at a position on the same side of said center of the differential as said at least one of said side and pinion gears.

16. A differential as claimed in claim 12, wherein all said teeth are straight bevel teeth.

17. A differential as claimed in claim 12, wherein all said teeth are spiral bevel teeth.

18. A differential as claimed in claim 12, wherein there are two pinions each with an odd number of teeth and an even number of teeth in each said side gear divisible by 2 or 4.

19. A differential as claimed in claim 12, wherein there are four pinions each with an odd number of teeth and an even number of teeth in each said side gear divisible by 4.

20. A differential as claimed in claim 12, wherein clutch plate means act between said housing and one of said side pinion gears to restrain differential action.

21. A differential including in combination a housing, first and second side gears having bevel teeth and being rotatively mounted in said housing, a pinion gear having bevel teeth and being rotatively mounted in said housing and having said bevel teeth thereof in meshing engagement with said bevel teeth of said first and second side gears, the center of the differential being the intersection of the axes of said side and pinion gears, each said side and pinion gears having its face structure modified into first and second portions, each of said first and second portions having a face cone and a generated pitch cone, the face cones of said first and second portions of said side and pinion gears intersecting its respective axis at first and second face cone apexes, the generated pitch cones of said first and second portions of said side and pinion gears intersecting its respective axis at first and second generated pitch cone apexes, said first and second generated pitch cone apexes and said first face cone apex being spaced from said second face cone apex of both said side and pinion gears.

22. A differential as claimed in claim 21, wherein each said side and pinion gears has a theoretical pitch cone which has an apex which intersects said center of the differential, said first and second generated pitch cone apexes and said first face cone apex of both said side and pinion gears also intersecting said center of the differential.

23. A differential including in combination a housing, first and second side gears having bevel teeth and being rotatively mounted in said housing, a pinion gear having bevel teeth and being rotatively mounted in said housing and having said bevel teeth thereof in meshing engagement with said bevel teeth of said first and second side gears, the center of the differential being the intersection of the axes of said side and pinion gears, the gear teeth of each of said side and pinion gears being modified, said pinion gear teeth having an addendum taper which increases from the end of the teeth closest to the center of the differential to approximately the middle of the teeth which pinion gear teeth addendum taper then changes to the end of the teeth furthest from the center of the differential, said meshing said gear teeth having an addendum taper which increases from the end of the teeth closest to the center of the differential to approximately the middle of the teeth which side gear teeth addendum taper then changes to the end of the teeth furthest from the center of the differential.

24. A differential as claimed in claim 23 wherein said pinion gear teeth addendum taper decreases from approximately the middle of the teeth to the end of the teeth furthest from the center of the differential and said side gear teeth addendum taper increases at a lesser rate from approximately the middle of the teeth to the end of the teeth furthest from the center of the differential.

25. A differential as claimed in claim 23, wherein all said teeth are straight bevel teeth.

26. A differential as claimed in claim 23, wherein all said teeth are spiral bevel teeth.

27. A differential as claimed in claim 23, wherein there are two pinions each with an odd number of teeth and an even number of teeth in each said side gear divisible by 2 or 4.

28. A differential as claimed in claim 23, wherein there are four pinions each with an odd number of teeth and an even number of teeth in each said side gear divisible by 4.

29. A differential as claimed in claim 23, wherein clutch plate means act between said housing and one of said side and pinion gears to restrain differential action.

30. A bevel gear having a toe portion and a heel portion, a plurality of circumferentially spaced gear teeth extending from said toe portion to said heel portion, each of said teeth having an addendum taper which increases from said toe portion to approximately the middle of the teeth and which addendum taper then changes from said approximately the middle of the teeth to said heel portion.

31. A bevel gear as claimed in claim 30, wherein said addendum taper decreases from said approximately the middle of the teeth to said heel portion.

32. A bevel gear as claimed in claim 30, wherein said addendum taper increases from said approximately the middle of the teeth at a lesser rate to said heel portion.

33. The combination of first and second bevel gears, each said first and second bevel gears having a toe portion and a heel portion, each said first and second bevel gears having a plurality of circumferentially spaced teeth extending from a respective toe portion to a respective heel portion, said teeth on said first and second bevel gears being rotatively intermeshed, said teeth of each of said first and second bevel gears being modified, each said first bevel gear teeth having an addendum taper which increases from said toe portion of said first bevel gear to approximately the middle of the teeth which first bevel gear teeth addendum taper then changes to said heel portion, each said meshing second bevel gear teeth having an addendum taper which increases from said toe portion of said second bevel gear to approximately the middle of the teeth which second bevel gear teeth addendum taper then changes to said heel portion.

34. The combination as claimed in claim 33, wherein said first bevel gear teeth addendum taper decreases from approximately said middle of the teeth to said heel portion and said second bevel gear teeth addendum taper increases at a lesser rate from approximately said middle of the teeth to said heel portion.

35. The combination as claimed in claim 34, wherein curved root lines are provided for the teeth on each of said first and second bevel gears which curved root lines envelope the face structure on a meshing tooth.

* * * * *